(12) United States Patent
Thiagarajan et al.

(10) Patent No.: US 7,842,379 B2
(45) Date of Patent: *Nov. 30, 2010

(54) POLYMERIC FOAMS WITH NANOCELLULAR MORPHOLOGY AND METHODS FOR MAKING THEM

(75) Inventors: Chinniah Thiagarajan, Bangalore (IN); Gautam Chatterjee, Bangalore (IN); Ravi Sriraman, Pune (IN); Santhosh Kumar Rajendran, Arakkonam (IN); Anand Vaidyalingam, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 581 days.

This patent is subject to a terminal disclaimer.

(21) Appl. No.: 11/773,529

(22) Filed: Jul. 5, 2007

(65) Prior Publication Data

US 2009/0130420 A1    May 21, 2009

(51) Int. Cl.
    *B32B 3/26*        (2006.01)
    *B29C 67/20*       (2006.01)
(52) U.S. Cl. ............... 428/315.7; 428/315.5; 428/317.9; 264/415; 264/419; 521/180
(58) Field of Classification Search ............... 428/315.5, 428/315.7, 317.9; 264/415, 419; 521/180
    See application file for complete search history.

(56) References Cited

U.S. PATENT DOCUMENTS

| 4,025,687 | A | 5/1977 | Wooler et al. |
| 4,882,363 | A | 11/1989 | Neuhaus et al. |
| 5,179,130 | A | 1/1993 | Bland et al. |
| 5,254,597 | A | 10/1993 | Horn et al. |
| 5,272,182 | A | 12/1993 | Burnell |
| 5,324,461 | A | 6/1994 | Grohman |
| 5,662,293 | A | 9/1997 | Hower et al. |
| 6,113,822 | A | 9/2000 | Adedeji |
| 6,403,663 | B1 | 6/2002 | DeSimone et al. |
| 6,555,589 | B1 | 4/2003 | Tan |
| 6,555,590 | B1 | 4/2003 | Tan |

(Continued)

FOREIGN PATENT DOCUMENTS

DE    19610330 A1    9/1997

(Continued)

OTHER PUBLICATIONS

Adhikari, Avishek, "A New Visual Cryptographic Scheme Using Latin Squares", IEICE Trans. Fundamentals, vol. E87-A. No. 5, Document No. XP-001196128, pp. 1198-1202, dated May 2004.

(Continued)

*Primary Examiner*—Hai Vo
(74) *Attorney, Agent, or Firm*—Cantor Colburn LLP (57) ABSTRACT

Polymeric foams having nanocellular morphology are formed from a polymeric material having structural units derived from 2-hydrocarbyl-3,3-bis(hydroxyphenyl)phthalimidine compound. The foams include a plurality of cells having an average diameter of less than 1 micron. Processes for forming the foams include melting a polymeric material having structural units derived from 2-hydrocarbyl-3,3-bis(hydroxyphenyl)phthalimidine compounds; diffusing a blowing agent into the polymeric material to form a mixture; nucleating bubbles in the mixture is at a sufficient temperature and pressure to enable the production of cells having an average diameter of less than 1 micron; stabilizing the cells; and forming the mixture into a desired shape.

21 Claims, 3 Drawing Sheets

U.S. PATENT DOCUMENTS

| | | | |
|---|---|---|---|
| 6,593,384 | B2 | 7/2003 | Anderson et al. |
| 6,884,377 | B1 | 4/2005 | Burnham et al. |
| 6,884,823 | B1 | 4/2005 | Pierick et al. |
| 2003/0105176 | A1 | 6/2003 | Haas et al. |
| 2003/0205832 | A1 | 11/2003 | Lee et al. |
| 2004/0082276 | A1 | 4/2004 | Prasad |
| 2004/0158013 | A1 | 8/2004 | Beckman et al. |
| 2004/0198853 | A1 | 10/2004 | Saito et al. |
| 2005/0222334 | A1* | 10/2005 | Srinivasan et al. .......... 525/178 |
| 2006/0127663 | A1 | 6/2006 | Strey et al. |
| 2006/0257594 | A1 | 11/2006 | Haas et al. |
| 2007/0010619 | A1 | 1/2007 | Chatterjee et al. |
| 2007/0045888 | A1 | 3/2007 | Lee et al. |
| 2007/0108465 | A1 | 5/2007 | Pacholski et al. |
| 2009/0148665 | A1* | 6/2009 | Thiagarajan et al. ........ 428/159 |
| 2009/0168176 | A1 | 7/2009 | Sriraman et al. |
| 2009/0247654 | A1* | 10/2009 | Rajendran et al. ............. 521/60 |
| 2009/0305030 | A1 | 12/2009 | Sriraman et al. |

FOREIGN PATENT DOCUMENTS

| | | | |
|---|---|---|---|
| DE | 41 06 935 | A1 | 12/2008 |
| EP | 0319866 | A2 | 6/1989 |
| EP | 0545175 | A2 | 6/1993 |
| EP | 1424124 | A1 | 6/2004 |
| EP | 1296810 | B1 | 9/2004 |
| GB | 1 158 606 | A | 7/1969 |
| GB | 1 196 128 | A | 6/1970 |
| GB | 1 562 616 | A | 3/1980 |
| JP | 02 261836 | A | 10/1990 |
| JP | 200555883 | A | 3/2005 |
| WO | 9634039 | A1 | 10/1996 |
| WO | 0018557 | | 4/2000 |
| WO | 0241987 | A2 | 5/2002 |
| WO | 2005092959 | A1 | 10/2005 |
| WO | 2007142260 | A1 | 12/2007 |

OTHER PUBLICATIONS

Wang, Zhonggang et al., "Hydrogen-Bonding in Cardo Copoly(aryl ether keton)s and Its Effects on the Gas Permeation Behavior" Document No. XP-002499699, Macromolecules 2007, 40, pp. 3238-3245, (c) 2007 American Chemical Society, Published on the Web Apr. 3, 2007.

Database WPI Week 199049, Thomson Scientific, London, GB; AN 1990-364544, 2 pages.

International Search Report mailed Oct. 31, 2008, received Nov. 4, 2008, 15 pages.

German Patent No. 19610330A1; Publication Date: Sep. 18, 1997, Abstract Only; 1 Page.

Japanese Patent No. 2005055883 (A); Publication Date: Mar. 3, 2005, Abstract Only; 1 Page.

International Publication No. 2005/092959 A1; International Publication Date: Oct. 6, 2005; Abstract Only; 1 Page.

International Publication No. 2007142260 (A1); Publication Date: Dec. 13, 2007; Abstract Only; 1 Page.

Japanese Patent No. 2007261071 (A); Publication Date: Oct. 11, 2007; Abstract Only; 1 Page.

International Search Report; International Application No. PCT/IB2008/000757; International Filing Date: Jan. 17, 2008; Date of Mailing: Apr. 6, 2009; 6 Pages.

Written Opinion of the International Searching Authority; International Application No. PCT/IB2008/000757; International Filing Date: Jan. 17, 2008; Date of Mailing: Apr. 6, 2009; 7 Pages.

International Search Report; International Application No. PCT/IB2008/055216; International Filing Date: Dec. 10, 2008; Date of Mailing: Oct. 21, 2009; 7 Pages.

Written Opinion of the International Searching Authority; International Application No. PCT/IB2008/055216; International Filing Date: Dec. 10, 2008; Date of Mailing: Oct. 21, 2009; 8 Pages.

International Search Report; International Application No. PCT/IB2008/051209; International Filing Date: Mar. 23, 2009; Date of Mailing: Aug. 5, 2009; 6 Pages.

Written Opinion of the International Searching Authority; International Application No. PCT/IB2008/051209; International Filing Date: Mar. 23, 2009; Date of Mailing: Aug. 5, 2009; 7 Pages.

U.S. Appl. No. 11/623,910, filed Jan. 17, 2007; Available in the Image File Wrapper.

* cited by examiner

─◆─ Lexan 105

─■─ High Heat Lexan ( 40% PPP)

Saturation pressure = 5.8

— ♦ — Lexan 105
— ■ — High Heat Lexan (30% PPP)

POLYMERIC FOAMS WITH NANOCELLULAR MORPHOLOGY AND METHODS FOR MAKING THEM

BACKGROUND

This disclosure relates generally to polymeric foams with nanocellular morphology and methods of making the polymeric foams. More particularly, the disclosure relates to polymeric foams that include a polymer and/or copolymer having structural units derived from 2-phenyl-3,3-bis(hydroxyphenyl)phthalimidine compounds.

Polymer foams have been prepared by diffusing a polymer blowing agent and/or foaming agent into the desired polymer. Solubility of the polymer-blowing agent in the host polymer is a factor that can determine the cell size. Solubility is generally limited such that microcellular morphology is the smallest cell size attainable with various blowing agents and polymer systems. In the past, solubility was increased by use of a high-pressure gas injection system, which is relatively expensive due to the high-pressure requirements. Other methods to increase solubility included the addition of additives, which can increase the polymer solubility for the polymer blowing agent but has also been found to depress the glass transition properties of the host polymer.

There remains a need in the art for improved methods for increasing solubility of the polymer blowing agent in the polymer. It would be desirable to have a composition that provides for increased blowing agent solubility without the need for additives and that does not depress the glass transition temperature. The solubility of the polymer blowing agent in the host polymer system should be effective to provide nanocellular morphology.

BRIEF SUMMARY

The present disclosure generally provides for polymeric articles and methods for making the polymeric foamed articles. In one embodiment, the polymeric foamed article, comprises a polymeric material having structural units derived from 2-hydrocarbyl-3,3-bis(hydroxyphenyl)phthalimidine compound; and a plurality of cells having an average diameter of about 1 nanometer to about 1000 nanometers.

In one embodiment, a method of making a foamed polymeric article comprises melting a polymeric material having structural units derived from 2-hydrocarbyl-3,3-bis(hydroxyphenyl)phthalimidine compounds; diffusing a blowing agent into the polymeric material to form a mixture; nucleating bubbles in the mixture at a sufficient temperature and pressure to enable the production of cells having an average diameter of less than 1 micron; stabilizing the cells; and forming the mixture into a desired shape.

In another embodiment, a method for forming a foamed article, comprises melt extruding a polycarbonate polymer comprising structural units derived from 2-phenyl-3,3-bis(hydroxyphenyl)phthalimidine compounds; saturating the polycarbonate polymer with blowing agent at a pressure and at a temperature effective to saturate the polycarbonate polymer with greater than 10 percent by weight of the polymer; nucleating bubbles in the mixture at a sufficient temperature and pressure to enable the production of cells having an average diameter of less than 1 micron; and stabilizing the cells to form the foamed article.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Polymeric foams with nanocellular morphology are formed of a polymer and/or a copolymer having structural units derived from 2-hydrocarbyl-3,3-bis(hydroxyphenyl)phthalimidine compounds. The polymers may be homopolymers or copolymers, including, without limitation, graft and block copolymers. The polymeric foam is formed by diffusing a polymer-blowing agent (PBA) into the polymer and/or copolymer having the structural units, inducing thermodynamic instability to the PBA to cause foaming within the polymer and/or copolymer, and quenching to control cell growth. Polymers that include the 2-hydrocarbyl-3,3-bis(hydroxyphenyl)phthalimidine structural units have been found to provide increased solubility of a polymer blowing agent at concentrations that lead to formation of a nanoporous polymer foam.

For the purposes of this disclosure, the term "nanoporous" is hereinafter defined as an average pore cell size of less than 1 micron. The term "blowing agent" is defined as a chemical agent that is used to foam a polymer. The blowing agent, also referred to herein as a foaming agent, may be a solid, a liquid, or a supercritical liquid. Suitable blowing agents that may be used include inorganic agents, organic agents and other chemical agents. Exemplary inorganic blowing agents include carbon dioxide, nitrogen, argon, water, air, nitrogen, and inert gases such as helium and argon. Exemplary organic agents include aliphatic hydrocarbons having 1-9 carbon atoms, aliphatic alcohols having 1-3 carbon atoms, and fully and partially halogenated aliphatic hydrocarbons having 1-4 carbon atoms. Aliphatic hydrocarbons include methane, ethane, propane, n-butane, isobutane, n-pentane, isopentane, neopentane, and the like. Aliphatic alcohols include methanol, ethanol, n-propanol and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroet- hane (HFC-143a), 1,1,1,2-tetrafluoro-ethane (HFC-134a), pentafluoroethane, difluoromethane, perfluoroethane, 2,2-difluoropropane, 1,1-trifluoropropane, perfluoropropane, dichloropropane, difluoropropane, perfluorobutane, perfluorocyclobutane, and the like. Partially halogenated chlorocarbons and chlorofluorocarbons include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123), 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Other chemical agents include azodicarbonamide, azodiisobutyronitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, trihydrazino triazine, and the like. In one embodiment, the blowing agent may be selected from the group consisting of carbon dioxide, air, nitrogen, argon, gaseous hydrocarbons, and combinations thereof. The blowing agent may be selected from the group consisting of solid carbon dioxide, liquid carbon dioxide, gaseous carbon dioxide, or supercritical carbon dioxide. Any of the inert gases, such as for example, helium, xenon, and argon may also be used. Non-limiting examples of gaseous hydrocarbons include methane, ethane, propane, and butane. In another embodiment, halohydrocarbons that would be expected to be in a gaseous form at ambient temperature and pressure may be used. Examples of such halohydrocarbons include fluorohydrocarbons, fluorocarbons, chlorocarbons, and chlorofluorocarbons.

In one embodiment, the process includes melting and/or extruding the polymer, saturating the molten polymer having the 2-hydrocarbyl-3,3-bis(hydroxyphenyl)phthalimidine structural units with a blowing agent. e.g., carbon dioxide, under pressure and at an elevated temperature, and subsequently inducing thermodynamic instability such as inducing a pressure decrease and/or temperature increase to promote bubble nucleation in the polymeric material. Foaming can then be quenched by immersion of the polymer in a suitable medium to stabilize the nanocellular morphology, e.g., immersion in a cold medium (e.g., water). Alternatively, a continuous melt extrusion method of foaming can be used. As used herein, the term "nucleation" is generally defined as a process by which a homogeneous solution of polymeric material and dissolved molecules of a species that is a gas under ambient conditions undergoes formations of clusters of molecules of the species that define "nucleation sites" from which cells will grow; i.e., it is a change from a homogeneous solution to a multi-phase mixture in which, throughout the polymeric material, sites of aggregation of at least several molecules of carbon dioxide gas bubbles are formed.

Figure 1:
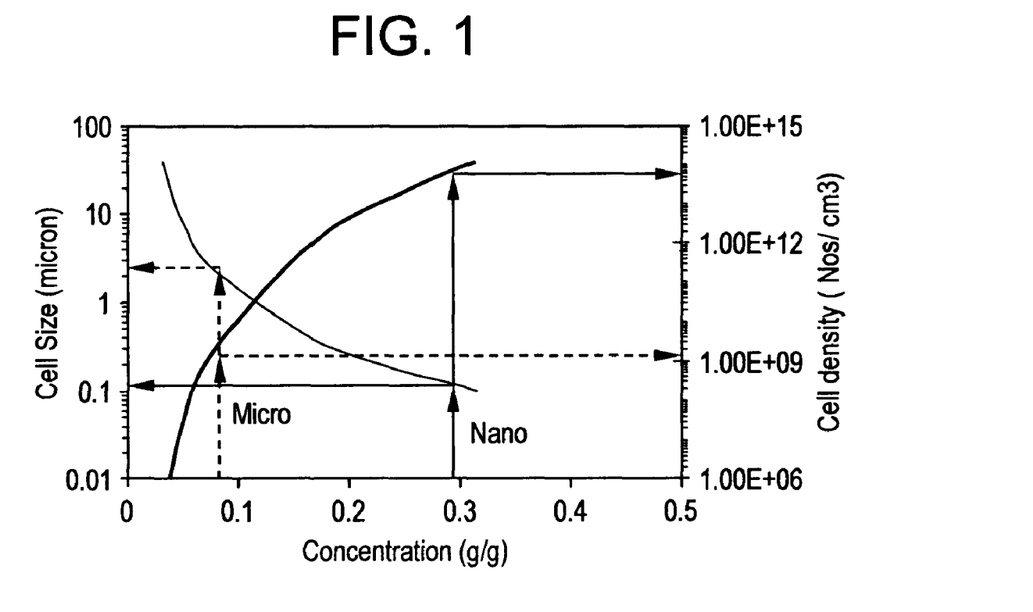
FIG. 1 graphically illustrates carbon dioxide gas concentration as a function of cell size and cell density in a polycarbonate copolymer that included 2-phenyl-3,3-bis(hydroxyphenyl)phthalimidine structural units.

To form nanocellular morphology, the diffused blowing agent content in the polymer and/or copolymer having the 2-hydrocarbyl-3,3-bis(hydroxyphenyl)phthalimidine structural units and without the use of any additives is from 10% to about 30% or greater by weight of carbon dioxide. Polymers and/or copolymers that include the 2-hydrocarbyl-3,3-bis(hydroxyphenyl)phthalimidine structural units are believed to provide increased free volume and provide increased solubility. While not wanting to be bound by theory, it is believed that the CO—N group present in the above noted structural unit is believed to contribute to the increased free volume and as such, the increased solubility of the blowing agent. FIG. 1 graphically illustrates the effect of gas concentration on cell size and cell density. As shown, an increase in carbon dioxide concentration results in higher cell density and smaller cell size. At concentrations greater than about 10 percent, cell size was less than 1 micron and steadily decreased as a function of concentration. Similarly, cell density increased as a function of increased carbon dioxide concentration in the polymer.

Using carbon dioxide as an a exemplary blowing agent, it has been found that the solubility of carbon dioxide in the polymer and/or copolymer having the above noted structural units is substantially linear to the amount of the structural units present in the polymer and/or copolymer. As such, since carbon dioxide solubility correlates in a linear manner to the increased amount of 2-hydrocarbyl-3,3-bis(hydroxyphenyl) phthalimidine structural units, pore (cell) size can be effectively controlled. If an increase in cell density or a decrease in cell size is desired, an end user simply increases the amount of structural units in the polymer and/or copolymer. However, it has been found that increased amounts of structural units can lead to an increase in glass transition temperature, which can be problematic for some continuous extrusion processes. Under these circumstances, an additive may be added to the polymer melt to depress the glass transition temperature. For example, a plasticizer such as a surfactant may be added, which may also further increase carbon dioxide solubility. Other types of additive as will be discussed in greater detail below may be added for desired properties for the polymeric foam article, e.g., improve pore size distribution.

Suitable 2-hydrocarbyl-3,3-bis(4-hydroxyaryl)phthalimidine structural units are shown in formula (I)

wherein $R^1$ is selected from a group consisting of a hydrogen and a hydrocarbyl group, and $R^2$ is selected from the group consisting of a hydrogen, a hydrocarbyl group, and a halogen.

The term "hydrocarbyl" is defined herein as a monovalent moiety formed by removing a hydrogen atom from a hydrocarbon. Representative hydrocarbyl moieties are aliphatic radicals, aromatic radicals, and cycloaliphatic radicals.

The term "aliphatic radical" refers to an organic radical having a valence of at least one comprising a linear or branched array of atoms which is not cyclic. The aliphatic radicals comprise at least one carbon atom. The array of atoms forming the aliphatic radical may further include heteroatoms such as nitrogen, sulfur, silicon, selenium and oxygen or may be composed exclusively of carbon and hydrogen. The "linear or branched array of atoms which is not cyclic" is intended to include a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, a suitable aliphatic radical is the 4-methylpent-1-yl radical, which is a $C_6$ aliphatic radical comprising a methyl group. Similarly, the 4-nitrobut-1-yl group is a $C_4$ aliphatic radical comprising a nitro functional group. Other suitable aliphatic radicals include a haloalkyl group that comprises one or more halogen atoms which may be the same or different. Suitable halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl; difluorovinylidene; trichloromethyl, bromodichloromethyl, bromoethyl, 2-bromotrimethylene (e.g. —$CH_2CHBrCH_2$—), and the like. Further examples of suitable aliphatic radicals include allyl, aminocarbonyl (—$CONH_2$), carbonyl, dicyanoisopropylidene (—$CH_2C(CN)_2CH_2$—), methyl (—$CH_3$), methylene (—$CH_2$—), ethyl, ethylene, formyl (—CHO), hexyl, hexamethylene, hydroxymethyl (—$CH_2OH$), mercaptomethyl (—$CH_2SH$), methylthio(—$SCH_3$), methylthiomethyl (—$CH_2SCH_3$), methoxy, methoxycarbonyl ($CH_3OCO$—), nitromethyl (—$CH_2NO_2$), thiocarbonyl, trimethylsilyl (($CH_3)_3Si$—), t-butyldimethylsilyl, trimethyoxysilypropyl (($CH_3O)_3SiCH_2CH_2CH_2$—), vinyl, vinylidene, and the like. By way of further example, a $C_1$-$C_{10}$ aliphatic radical contains at least one but no more than 10 carbon atoms.

The term "aromatic radical" is also sometimes referred herein to as an "aryl radical". The aromatic radical or the aryl radical refers to an array of atoms having a valence of at least one comprising at least one aromatic group. The aromatic radical may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include non-aromatic components. For example, a benzyl group is an aromatic radical that comprises a phenyl ring (the aromatic group) and a methylene group (the non-aromatic component). Similarly a tetrahydronaphthyl radical is an aromatic radical comprising an aromatic group ($C_6H_3$) fused to a non-aromatic component —($CH_2)_4$—. The "aromatic radical" can encompass a wide range of functional groups such as alkyl groups, alkenyl groups, alkynyl groups, haloalkyl groups, haloaromatic groups, conjugated dienyl groups, alcohol groups, ether groups, aldehydes groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl alkyl group. Similarly, the 2-nitrophenyl group is a $C_6$ aromatic radical comprising a nitro functional group. Suitable aromatic radicals may include halogenated aromatic radicals such as trifluoromethylphenyl, hexafluoroisopropylidenebis(4-phen-1-yloxy) (—$OPhC(CF_3)_2PhO$—), chloromethylphenyl; 3-trifluorovinyl-2-thienyl; 3-trichloromethylphen-1-yl (3-$CCl_3Ph$-), 4(3-bromoprop-1-yl)phen-1-yl ($BrCH_2CH_2CH_2Ph$-), and the like. Further examples of aromatic radicals include 4-allyloxyphen-1-oxy, 4-aminophen-1-yl ($H_2NPh$-), 3-aminocarbonylphen-1-yl ($NH_2COPh$-), 4-benzoylphen-1-yl, dicyanoisopropylidenebis(4-phen-1-yloxy) (—$OPhC(CN)_2PhO$—), 3-methylphen-1-yl, methylenebis(phen-4-yloxy) (—$OPhCH_2PhO$—), 2-ethylphen-1-yl, phenylethenyl, 3-formyl-2-thienyl, 2-hexyl-5-furanyl; hexamethylene-1,6-bis(phen-4-yloxy) (—$OPh(CH_2)_6PhO$—); 4-hydroxymethylphen-1-yl (4-1$HOCH_2Ph$-), 4-mercaptomethylphen-1-yl (4-$HSCH_2Ph$-), 4-methylthiophen-1-yl (4-$CH_3SPh$-), 3-methoxyphen-1-yl, 2-methoxycarbonylphen-1-yloxy(methyl salicyl), 2-nitromethylphen-1-yl, 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_8$—) represents a $C_7$ aromatic radical.

The term "cycloaliphatic radical" refers to a radical having a valence of at least one and comprising an array of atoms that is cyclic but not aromatic. As defined herein a "cycloaliphatic radical" does not contain an aromatic group and may further include one or more noncyclic components. For example, a cyclohexylmethyl group ($C_6H_{11}CH_2$—) is a cycloaliphatic radical that comprises a cyclohexyl ring (the array of atoms is cyclic but not aromatic) and a methylene group (the noncyclic component). The cycloaliphatic radical may further include heteroatoms such as nitrogen, sulfur, selenium, silicon and oxygen, or may be composed exclusively of carbon and hydrogen. In addition, the cycloaliphatic radical can encompass a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A suitable cycloaliphatic radical may also comprise one or more halogen atoms which may be the same or different. Suitable halogen atoms include, for example; fluorine, chlorine, bromine, and iodine.

Suitable cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl)(—$C_6H_{10}C(CF_3)_2C_6H_{10}$—), 2-chloromethylcyclohex-1-yl; 3-difluoromethylenecyclohex-1-yl; 4-trichloromethylcyclohex-1-yloxy, 4-bromodichloromethylcyclohex-1-ylthio, 2-bromoethylcyclopent-1-yl, 2-bromopropylcyclohex-1-yloxy (e.g. $CH_3CHBrCH_2C_6H_{10}$—), and the like. Further examples of cycloaliphatic radicals include 4-allyloxycyclohex-1-yl, 4-aminocyclohex-1-yl ($H_2NC_6H_{10}$—), 4-aminocarbonylcyclopent-1-yl ($NH_2COC_5H_8$—), 4-acetyloxycyclohex-1-yl, 2,2-dicyanoisopropylidenebis(cyclohex-4-yloxy) (—$OC_6H_{10}C(CN)_2 C_6H_{10}O$—), 3-methylcyclohex-1-yl, methylenebis(cyclohex-4-yloxy) (—$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl; hexamethylene-1,6-bis(cyclohex-4-yloxy) (—$OC_6H_{10}(CH_2)_6 C_6H_{10}O$—); 4-hydroxymethylcyclohex-1-yl (4-$HOCH_2C_6H_{10}$—), 4-mercaptomethylcyclohex-1-yl (4-$HSCH_2C_6H_{10}$—), 4-methylthiocyclohex-1-yl (i.e. 4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl ($NO_2CH_2C_6H_{10}$—), 3-trimethylsilyl cyclohex-1-yl, 2-t-butyldimethylsilylcyclopent-1-yl, 4-trimethoxysilylethylcyclohex-1-yl ((CH$_3$O)$_3$SiCH$_2$CH$_2$C$_6$H$_{10}$—), 4-vinylcyclohexen-1-yl, vinylidenebis(cyclohexyl), and the like.

By way of example, 2-aryl-3,3-bis(4-hydreoxyaryl)phthalimidines can generally be prepared by reaction of an aromatic amine (also referred to herein as "aryl amine"), e.g., an aniline, of formula (II):

(II)

wherein R$^1$ is as defined above; with a phenolphthalein of formula (III):

(III)

wherein R$^2$ is as previously defined. In contrast, aliphatic or cycloaliphatic 3,3-bis(4-hydroxyaryl)phthalimidines will use the respective aliphatic or cycloaliphatic amine.

An acid catalyst is generally used to facilitate formation of the 2-hydrocarbyl-3,3-bis(4-hydroxyaryl)phthalimidine product. Suitable acid catalysts that can be used include amine salts of mineral acids. Examples of suitable mineral acids include hydrochloric acid, sulfuric acid, and nitric acid. Examples of suitable amines include primary, secondary, and tertiary amines having any combination of aliphatic and aromatic groups bonded to the amine nitrogen. Suitable examples of amine salt catalysts include primary, secondary, and tertiary amine hydrochlorides. Hydrochloride salts of the primary aromatic amines of formula (II) are preferred since the aromatic amines of formula (II) can also serve as the starting material for preparing the phthalimidines of formula (I). In one embodiment, the catalyst can be introduced as a pre-formed salt into the reactor. In another embodiment, the catalyst can be generated in the reactor by first charging the amine (e.g., the amine of formula (II)) into the reactor, and then adding about ⅓ to about 1 part by weight of an appropriate mineral acid to phenolphthalein. In still another embodiment, about 0.1 parts to about 0.3 parts by weight of hydrogen chloride gas is introduced into a reactor charged with the aryl amine to form an appropriate amount of the aryl amine hydrochloride catalyst. More hydrochloric acid or more hydrogen chloride gas can also be used, but is generally not required. A solvent can optionally be employed to form the aryl amine hydrochloride. The solvent can then be removed (if necessary), and the aryl amine of formula (II) can be added, followed by addition of phenolphthalein (III). The reaction of phenolphthalein (III) with the aryl amine (II) proceeds by a condensation reaction to form the desired phthalimidine product (I). An excess of the amine over the phenolphthalein may be used to keep the reaction proceeding in the forward direction. Likewise, a higher reaction temperature with or without removal of water by-product also facilitates product formation. However, in order to enhance the selectivity of 2-hydrocarbyl-3,3-bis(4-hydroxyaryl) phthalimidine (I), and suppress the formation of undesired by-products, it is generally preferred to control the temperature of the reaction mixture and the rate of removal of water as well. The temperature of the reaction mixture and rate of water removal is controlled such that the crude 2-hydrocarbyl-3,3-bis(4-hydroxyaryl)phthalimidine product is at least 97.5 area percent pure 2-hydrocarbyl-3,3-bis(4-hydroxyaryl)phthalimidine in one embodiment, and at least 98 area percent pure in another embodiment.

In one embodiment, the reaction temperature is controlled such that the water by-product (calculated based on the moles of the phenolphthalein (III) which is preferably the limiting reagent) distills over a period of about 12 hours to about 20 hours. If the reaction mixture is heated such that the amount of water by-product distills within about 6 hours, the phthalimidine product of formula (I) can have a relatively greater amount of impurity, e.g., (2-hydroxyaryl)(4-hydroxyaryl)phthalimidine. Therefore, although a higher reaction temperature ensures a quicker consumption of the phenolphthalein (III), it also leads to formation of a higher amount of the impurity. If the reaction temperature is not sufficiently high, and water by-product is not removed, a relatively large amount of the phenolphthalein remains unreacted, thereby leading to an inferior product, e.g., forms colored byproducts during melt mixing, forms low molecular weight polymers, and the like. Thus, in one embodiment, the reaction mixture is heated to a temperature of about 150° C. to about 175° C. to remove water by-product and form the 2-hydrocarbyl-3,3-bis(4-hydroxyaryl)phthalimidine product. In another embodiment, the reaction mixture is heated to a temperature of about 150° C. to about 170° C.

By way of example, phenolphthalein (R$^2$ is phenyl in formula (III)) was reacted with aniline (R$^1$ is H in formula (II)) in the presence of aniline hydrochloride as the catalyst to form 2-phenyl-3,3-bis(4-hydroxyphenyl)phthalimidine (i.e., PPPBP), as shown in formula (IV).

(IV)

Isolation of the 2-hydrocarbyl-3,3-bis(4-hydroxyaryl)phthalimidine from the reaction mixture includes quenching the mixture with an aqueous mineral acid, such as aqueous hydrochloric acid, and precipitating the crude 2-hydrocarbyl-3,3-bis(4-hydroxyaryl)phthalimidine. The crude product is then dissolved in an aqueous inorganic base comprising an alkali metal or alkaline earth metal hydroxide, carbonate, or bicarbonate to provide a first solution. Aqueous sodium hydroxide can be used. Next, the first solution of the crude product is treated with a suitable solid adsorbent that can remove color-forming species present in the solution. In one embodiment, commercially available activated carbon can be used. Treatment with the activated carbon removes color-forming species present in the solution. Suitable activated carbon include, but are not intended to be limited to, the NORIT series of activated carbon available from Norit Corporation, and those activated carbons commercially available from E. Merck Company. After treatment with the activated carbon, the resulting mixture can be filtered to provide a second solution.

The decolorized and purified solution is next treated with an aqueous mineral acid, such as aqueous hydrochloric acid to precipitate 2-hydrocarbyl-3,3-bis(4-hydroxyaryl)phthalimidine. The precipitate is then finally stirred with an aliphatic alcohol to remove any trace of the phenolphthalein that may still be present and subsequently filtered to furnish purified 2-hydrocarbyl-3,3-bis(4-hydroxyaryl)phthalimidine. Suitable aliphatic alcohols include any aliphatic monohydric or dihydric alcohol. Non-limiting examples of suitable aliphatic alcohols include methanol, ethanol, iso-propanol, iso-butanol, n-butanol, tertiary butanol, n-pentanol, iso-pentanol, cyclohexanol, ethylene glycol propylene glycol, neopentyl glycol and the like. In a particular embodiment, aliphatic monohydric alcohols that are miscible with water, such as methanol, ethanol, and isopropanol are used. Methanol is the preferred aliphatic alcohol for removing phenolphthalein.

In another embodiment, a method for purifying crude 2-hydrocarbyl-3,3-bis(4-hydroxyaryl)phthalimidine product comprises dissolving the crude product in an aqueous base solution, treating the aqueous base solution of the crude product with the activated carbon, filtering off the carbon to provide a second solution, and acidifying the second solution with an aqueous acid to precipitate the 2-hydrocarbyl-3,3-bis (4-hydroxyaryl)phthalimidine. The resulting product can then be contacted with an aliphatic alcohol in the manner previously described.

The 2-hydrocarbyl-3,3-bis(4-hydroxyaryl)phthalimidines, including the exemplary 2-phenyl-3,3-bis(4-hydroxyphenyl)phthalimidine, are commercially valuable monomers or comonomers for producing a variety of polymers and copolymer compositions formed by reactions of the phenolic OH groups of the 2-hydrocarbyl-3,3-bis(4-hydroxyaryl)phthalimidines. Suitable polymers that can be produced are polymers selected from the group consisting of homopolymers and copolymers of a polycarbonate, a polyarylate, a polyestercarbonate, a polyester, a polyesteramide, a polyimide, a polyetherimide, a polyamideimide, a polyether, a polyethersulfone, a polycarbonate-polyorganosiloxane block copolymer, a copolymer comprising aromatic ester, estercarbonate, and carbonate repeat units; a polyetherketone; and the like. An example of a copolymer comprising aromatic ester, estercarbonate, and carbonate repeat units is the copolymer produced by the reaction of a hydroxy-terminated polyester, such as the product of reaction of isophthaloyl chloride, and terephthaloyl chloride with resorcinol, with phosgene and an aromatic dihydroxy compound, such as bisphenol A.

In one embodiment, polycarbonates having desirable properties for the intended application e.g., foamed polymer sheet, are synthesized, wherein the polycarbonates include structural units of formula (V):

which are derived from 2-hydrocarbyl-3,3-bis(4-hydroxyaryl)phthalimidine; wherein $R^1$ and $R^2$ are as described previously; and the C=O structural units are derived from a C=O donor such as phosgene or a carbonic acid diester.

The polycarbonate composition may further comprise structural units derived from at least one other aromatic dihydroxy compound such as is represented by the general formula (V):

wherein each $G^1$ is an independently aromatic group; E is selected from the group consisting of an alkylene group, an alkylidene group, a cycloaliphatic group, a sulfur-containing linkage group, a phosphorus-containing linkage group, an ether linkage group, a carbonyl group, a tertiary nitrogen group, and a silicon-containing linkage group; $R^3$ is a hydrogen or a monovalent hydrocarbon group each; $Y^1$ is independently selected from the groups consisting of a monovalent hydrocarbyl group, an alkenyl group, an allyl group, a halogen, an oxy group and a nitro group; each m is independently a whole number from zero through the number of positions on each respective $G^1$ available for substitution; p is a whole number from zero through the number of positions on E available for substitution; t is a natural number greater than or equal to one; s is either zero or one; and u is a whole number.

Suitable examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, and adamantylidene; a sulfur-containing linkage such as sulfide, sulfoxide or sulfone, a phosphorus-containing linkage such as phosphinyl, phosphonyl, an ether linkage, a carbonyl group, a tertiary nitrogen group, and a silicon-containing linkage such as a silane or siloxy linkage.

In the aromatic dihydroxy comonomer compound shown in Formula (VI), when more than one $Y^1$ substituent is present, they may be the same or different. The same holds true for the $R^3$ substituent. Where "s" is zero in formula (VI) and "u" is not zero, the aromatic rings are directly joined with no intervening alkylidene or other bridge. The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some embodiments, the parameters "t", "s", and "u" are each one; both $G^1$ radicals are unsubstituted phenylene radicals; and E is an alkylidene group such as isopropylidene. In particular embodiments, both $G^1$ radicals are p-phenylene, although both may be ortho- or meta-phenylene or one ortho- or meta-phenylene and the other para-phenylene.

Some illustrative, non-limiting examples of aromatic dihydroxy compounds of formula (VI) include the dihydroxy-substituted aromatic hydrocarbons disclosed by name or formula (generic or specific) in U.S. Pat. No. 4,217,438. Some particular examples of aromatic dihydroxy compound comonomers include, but are not intended to be limited to, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane: 2,2-bis(3,5-dibromo-4-hydroxyphenyl)propane: 2,2-bis(3,5-dimethyl-4-hydroxyphenyl)propane; 22-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane: 2,2-bis(3-bromo-4-hydroxy-5-isopropylphenyl)propane; 2,2-bis(3-t-butyl-5-chloro-4-hydroxyphenyl)propane: 2,2-bis(3-bromo-5-t-butyl-4-hydroxyphenyl)propane: 2,2-bis(3-chloro-5-phenyl-4-hydroxyphenyl)propane: 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,3',5'-tetrachloro-44'-dihydroxyphenyl)propane, bis(4-hydroxyphenyl)cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'methylphenyl)cyclohexane (DMBPC), 1,1-bis(3,5-dimethyl-4-hydroxyphenyl)cyclohexane; 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2.8 BHPM), 3,8-dihydroxy-5a, 10b-diphenylcoumarano-2',3',2,3-coumarane (DCBP), 2-phenyl-3,3-bis(4-hydroxyphenyl)phthalimidine, 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane: 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-(dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1-bis(3-bromo-4-hydroxyphenyl)-3,3,5-trimethylcyclohexane: 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,35-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4' dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol, 4,4'-bis(3,5-dimethyl)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene, 1,4-bis(2-(4-hydroxyphenyl)-2-propyl)benzene, 1,4-bis(2-(4-hydroxy-3-methylphenyl)-2-propyl)benzene 2,4'-dihydroxyphenyl sulfone, 4,4'-dihydroxydiphenylsulfone (BPS), bis(4-hydroxyphenyl)methane, 2,6-dihydroxy naphthalene; hydroquinone; resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol. The most typical aromatic dihydroxy compound is Bisphenol A (BPA).

In some embodiments, an isosorbide comonomer can be used with the 2-hydrocarbyl-3,3-bis(4-hydroxyaryl)phthalimidine monomer to produce polycarbonate copolymers. Iso- sosorbide, sometimes also called 1,4:3,6-dianhydo-D-glucitol, is a rigid, chemically, and thermally stable aliphatic diol that tends to produce copolymers having higher glass transition temperatures, as compared to comonomer compositions which do not include isosorbide.

The carbonic acid diester described above has the general formula (VII):

$$(ZO)_2C=O \tag{VII}$$

wherein each Z is independently an unsubstituted or substituted alkyl radical, or an unsubstituted or substituted aryl radical. Suitable examples of carbonic acid diesters include, but are not intended to be limited to, ditolyl carbonate, m-cresyl carbonate, dinaphthyl carbonate, diphenyl carbonate, diethyl carbonate, dimethyl carbonate, dibutyl carbonate, dicyclohexyl carbonate, and combinations of two or more carbonic acid diesters thereof. Diphenyl carbonate is widely used as a carbonic acid diester due to its low cost and ready availability on a commercial scale. If two or more of the carbonic acid diesters listed above are utilized, preferably one of the carbonic acid diesters is diphenyl carbonate.

Suitable carbonic acid diesters include the group of "activated aromatic carbonates". As used herein, the term "activated aromatic carbonate" is defined as a diaryl carbonate that is more reactive than diphenyl carbonate in a transesterification reaction. Such activated aromatic carbonates can also be represented by formula (VII), wherein each Z is an aryl radical having 6 to 30 carbon atoms. More specifically, the activated carbonates have the general formula (VII):

(VIII)

wherein Q and Q' are each independently an ortho-positioned activating group; A and A' are each independently aromatic rings which can be the same or different depending on the number and location of their substituent groups, and a and a' is zero to a whole number up to a maximum equivalent to the number of replaceable hydrogen groups substituted on the aromatic rings A and A' respectively, provided a+a' is greater than or equal to 1. $R^4$ and $R^5$ are each independently substituent groups such as alkyl, substituted alkyl, cycloalkyl, alkoxy, aryl, alkylaryl, cyano, nitro, or halogen. The term b is zero to a whole number up to a maximum equivalent to the number of replaceable hydrogen atoms on the aromatic ring A minus the number a, and the number b' is zero to a whole number up to a maximum equivalent to the number of replaceable hydrogen atoms on the aromatic ring A' minus the number a'. The number, type and location of $R^4$ or $R^5$ on the aromatic ring is not intended to be limited unless they deactivate the carbonate and lead to a carbonate that is less reactive than diphenyl carbonate.

Non-limiting examples of suitable ortho-positioned activating groups Q and Q' include (alkoxycarbonyl)aryl groups, (arylketone)aryl groups, halogens, nitro groups, amide groups, sulfone groups, sulfoxide groups, or imine groups with structures indicated below:

wherein X is halogen or $NO_2$; M and M' independently comprises N-dialkyl N-alkyl aryl, alkyl, or aryl; and $R^6$ is alkyl or aryl.

Specific non-limiting examples of activated aromatic carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl) carbonate, bis(o-formylphenyl)carbonate. Unsymmetrical combinations of these structures, wherein the substitution number and type on A and A' are different, are also contemplated. A preferred structure for the activated aromatic carbonate is an ester-substituted diaryl carbonate having the formula (IX):

(IX)

wherein $R^7$ is independently at each occurrence a $C_1$-$C_{20}$ alkyl radical, $C_4$-$C_{20}$ cycloalkyl radical, or $C_4$-$C_{20}$ aromatic radical; $R^8$ is independently at each occurrence a halogen atom, cyano group, nitro group, $C_1$-$C_{20}$ alkyl radical, $C_4$-$C_{20}$ cycloalkyl radical, $C_4$-$C_{20}$ aromatic radical, $C_1$-$C_{20}$ alkoxy radical, $C_4$-$C_{20}$ cycloalkoxy radical, $C_4$-$C_{20}$ aryloxy radical, $C_1$-$C_{20}$ alkylthio radical, $C_4$-$C_{20}$ cycloalkylthio radical, $C_4$-$C_{20}$ arylthio radical, $C_1$-$C_{20}$ alkylsulfinyl radical, $C_4$-$C_{20}$ cycloalkylsulfinyl radical, $C_4$-$C_{20}$ arylsulfinyl radical, $C_1$-$C_{20}$ alkylsulfonyl radical, $C_4$-$C_{20}$ cycloalkylsulfonyl radical, $C_4$-$C_{20}$ arylsulfonyl radical, $C_1$-$C_{20}$ alkoxycarbonyl radical, $C_4$-$C_{20}$ cycloalkoxycarbonyl radical, $C_4$-$C_{20}$ aryloxycarbonyl radical, $C_2$-$C_{60}$ alkylamino radical, $C_6$-$C_{60}$ cycloalkylamino radical, $C_5$-$C_{60}$ arylamino radical, $C_1$-$C_{40}$ alkylaminocarbonyl radical, $C_4$-$C_{40}$ cycloalkylaminocarbonyl radical, $C_4$-$C_{40}$ arylaminocarbonyl radical, or $C_1$-$C_{20}$ acylamino radical; and c is independently at each occurrence an integer 0-4. At least one of the substituents $CO_2R^5$ is preferably attached in the ortho position of formula (IX).

Examples of preferred ester-substituted diaryl carbonates include, but are not limited to, bis(methylsalicyl)carbonate (CAS Registry No. 82091-12-1) (also known as BMSC or bis(o-methoxycarbonylphenyl)carbonate), bis(ethyl salicyl) carbonate, bis(propyl salicyl) carbonate, bis(butylsalicyl) carbonate, bis(benzyl salicyl)carbonate, bis(methyl 4-chlorosalicyl)carbonate and the like. In one embodiment, BSMC is used in melt polycarbonate synthesis due to its lower molecular weight and higher vapor pressure.

A number of polymerization methods can be used for producing the polymer, such as a homopolycarbonate or a copolycarbonate, comprising structural units derived from a 2-hydrocarbyl-3,3-bis(4-hydroxyaryl)phthalimidine. Suitable methods for fabricating polycarbonates, for example, include a melt transesterification polymerization method, an interfacial polymerization method, and a bischloroformate polymerization method.

The melt transesterification polymerization method is generally carried out by combining a catalyst and a reactant composition to form a reaction mixture; and mixing the reaction mixture under reactive conditions for a time period effective to produce a polycarbonate product, wherein the reactant composition generally comprises a carbonic acid diester of the formula $(ZO)_2C=O$, wherein each Z is independently an unsubstituted or a substituted alkyl radical, or an unsubstituted or a substituted aryl radical and the 2-hydrocarbyl-3,3-bis(4-hydroxyaryl)phthalimidine.

During the manufacture of the polycarbonates by the melt transesterification method using the activated or unactivated carbonic acid diester, the amount of the carbonic acid diester comprises about 0.8 moles to about 1.30 moles, and more specifically about 0.9 moles to about 1.2 moles, based on one mole of the 2-hydrocarbyl-3,3-bis(4-hydroxyaryl)phthalimidine or any combination of the 2-hydrocarbyl-3,3-bis(4-hydroxyaryl)phthalimidine and at least one aromatic dihydroxy comonomer.

Suitable melt transesterification catalysts include alkali metal compounds, alkaline earth metal compounds, tetraorganoammonium compounds, and tetraorganophosphonium compounds, combinations comprising at least one of the foregoing catalysts.

Specific examples of alkali metal compounds or alkaline earth metal compounds include organic acid salts, inorganic acid salts, oxides, hydroxides, hydrides, and alcoholates of alkali metals and alkaline earth metals. Preferably, the catalyst is an alkali metal compound of the formula $M_1X_1$, wherein $M_1$ is selected from the group consisting of lithium, sodium, and potassium; and $X_1$ is selected from the group consisting of hydroxide and OAr, wherein Ar is a monovalent aromatic radical.

More specifically, examples of suitable alkali metal compounds include, but are not limited to, sodium hydroxide, potassium hydroxide, lithium hydroxide, calcium hydroxide, magnesium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, lithium salts of phenol, and the like.

Specific examples of alkaline earth metal compounds include, but are not limited to, calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, strontium stearate, and the like.

In one embodiment, the catalyst comprises tetrabutylphosphonium acetate. In an alternate embodiment, the catalyst comprises a mixture of an alkali metal salt or alkaline earth metal salt with at least one quaternary ammonium compound, at least one quaternary phosphonium compound, or a mixture thereof. For example, the catalyst may be a mixture of sodium hydroxide and tetrabutylphosphonium acetate. In another embodiment, the catalyst is a mixture of sodium hydroxide and tetramethyl ammonium hydroxide.

In another embodiment, the catalyst comprises an alkaline earth metal salt of an organic acid, an alkali metal salt of an organic acid, or a salt of an organic acid comprising both alkaline earth metal ions and alkali metal ions. Alkali metal and alkaline earth metal salts of organic acids, such as for example, formic acid, acetic acid, stearic acid and ethylenediamine tetraacetic acid can also be used. In one embodiment, the catalyst comprises magnesium disodium ethylenediamine tetraacetate (EDTA magnesium disodium salt).

In yet another embodiment the catalyst comprises the salt of a non-volatile inorganic acid. By "non-volatile" it is meant that the referenced compounds have no appreciable vapor pressure at ambient temperature and pressure. In particular, these compounds are not volatile at temperatures at which melt polymerizations of polycarbonate are typically conducted. The salts of non-volatile acids are alkali metal salts of phosphites; alkaline earth metal salts of phosphites; alkali metal salts of phosphates; and alkaline earth metal salts of phosphates. Suitable salts of non-volatile acids include $NaH_2PO_3$, $NaH_2PO_4$, $Na_2H_2PO_3$, $KH_2PO_4$, $CsH_2PO_4$, $Cs_2H_2PO_4$, or a mixture thereof. In one embodiment, the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst.

Any of the catalysts disclosed above may be used as combinations of two or more substances. The catalyst may be added in a variety of forms. The catalyst may be added as a solid, for example as a powder, or it may be dissolved in a solvent, for example, in water or alcohol. The total catalyst composition is preferably about $1 \times 10^{-7}$ to about $2 \times 10^{-3}$ moles, and with about $1 \times 10^{-6}$ to about $4 \times 10^{-4}$ moles more preferred for each mole of the combination of the para, para-PPPBP and the aromatic dihydroxy compound comonomer.

Any of the catalysts described above for use in polycarbonate melt transesterification reactions may be used in reactions involving activated carbonates. It is often advantageous to use a combination of some amount of a salt of an alkaline earth metal and/or an alkali metal (i.e., an "alpha" catalyst) that does not degrade at temperatures used throughout the reaction together with a quaternary ammonium and/or a quaternary phosphonium compound that does degrade at a temperature used in the reaction (i.e., a "beta" catalyst). The total amount of catalyst employed is about $1 \times 10^{-7}$ to about $1 \times 10^{-2}$, and preferably about $1 \times 10^{-7}$ to about $2 \times 10^{-3}$ moles catalyst per total moles of the mixture of para, para-PPPBP and aromatic dihydroxy compound employed.

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants. Typically, the activated aromatic carbonate is added at a mole ratio of about 0.8 to about 1.3, and more specifically, 0.9 to about 1.2 and all sub-ranges there between, relative to the total moles of aromatic dihydroxy compound and aliphatic diol.

The melt polymerization reaction using the activated aromatic carbonate is conducted by subjecting the above reaction mixture to a series of temperature-pressure-time protocols. In some embodiments, this involves gradually raising the reaction temperature in stages while gradually lowering the pressure in stages. In one embodiment, the pressure is reduced from about atmospheric pressure at the start of the reaction to about 0.01 millibar (1 Pascal) or in another embodiment to 0.05 millibar (5 Pascals) in several steps as the reaction approaches completion. The temperature may be varied in a stepwise fashion beginning at a temperature of about the melting temperature of the reaction mixture and subsequently increased to about 320° C. In one embodiment, the reaction mixture is heated from about ambient (about 21-23° C.) temperature to about 150° C. The polymerization reaction starts at a temperature of about 15° C. to about 220° C., then is increased to about 220° C. to about 250° C. and is then further increased to a temperature of about 250° C. to about 320° C. and all sub-ranges there-between. The total reaction time is about 30 minutes to about 200 minutes and all sub-ranges there between. This procedure will generally ensure that the reactants react to give polycarbonates with the desired molecular weight, glass transition temperature and physical properties. The reaction proceeds to build the polycarbonate chain with production of a by-product such as, for example an ester-substituted alcohol e.g., methyl salicylate. Efficient removal of the by-product may be achieved by different techniques such as reducing the pressure. Generally the pressure starts relatively high in the beginning of the reaction, such as atmospheric pressure in one embodiment, and is lowered progressively throughout the reaction and temperature is raised throughout the reaction. Experimentation is needed to find the most efficient conditions for particular production equipment.

The progress of the reaction may be monitored by measuring the melt viscosity or the weight average molecular weight of the reaction mixture using techniques known in the art such as gel permeation chromatography. These properties may be measured by taking discreet samples or may be measured on-line. After the desired melt viscosity and/or molecular weight is reached, the final polycarbonate product may be isolated from the reactor in a solid or molten form. It will be appreciated by a person skilled in the art, that the method of making polycarbonates as described in the preceding sections may be made in a batch or a continuous process and the process disclosed herein is essentially preferably carried out in a solvent free mode. Reactors chosen should ideally be self-cleaning and should minimize any "hot spots."

In one embodiment, the aliphatic homopolycarbonate and aliphatic-aromatic copolycarbonate may be prepared in an extruder in presence of one or more catalysts, wherein the carbonating agent is an activated aromatic carbonate. The reactants for the polymerization reaction can be fed to the extruder in powder or molten form. In one embodiment, the reactants are dry blended prior to addition to the extruder. The extruder may be equipped with pressure reducing devices (e.g., vents), which serve to remove the activated phenol by-product and thus drive the polymerization reaction toward completion. The molecular weight of the polycarbonate product may be manipulated by controlling, among other factors, the fled rate of the reactants, the type of extruder, the extruder screw design and configuration, the residence time in the extruder, the reaction temperature and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, side-streams and sizes. One skilled in the art may have to experiment to find the best designs using generally known principals of commercial extruder design. Vented extruders similar to those that are commercially available may also be used.

The process disclosed herein can be used to prepare PPPBP homopolycarbonate and copolycarbonates having a weight average molecular weight (Mw) of about 3,000 to about 150,000 and a glass transition temperature (Tg) of about 80° C. to about 300° C. The number average molecular weights (Mn) of the homopolycarbonate and copolycarbonates is from about 1,500 to about 75,000. The transparency of cast films made from the polycarbonate or copolycarbonates prepared in accordance with the present disclosure is greater than about 85 percent, as determined by a Haze Guard Instrument.

In the interfacial polymerization method, 2-hydrocarbyl-3,3-bis(4-hydroxyaryl)phthalimidine, with or without one or more comonomers, and phosgene are reacted in the presence of an acid acceptor and an aqueous base to produce said polycarbonate. Tertiary amines, such as for example, trialkylamines are preferably used as acid acceptors. An exemplary trialkylamine is triethylamine. Suitable aqueous bases include, for example, the alkali metal hydroxides, such as sodium hydroxide. The interfacial method can be used for producing polycarbonates comprising structural units derived from 2-hydrocarbyl-3,3-bis(4-hydroxyaryl)phthalimidine, and preferably having molecular weights greater than about 50,000, relative to polystyrene standard.

The interfacial method described above can be suitably adapted to produce polycarbonates through the intermediate formation of 2-hydrocarbyl-3,3-bis(4-hydroxyaryl)phthalimidine bischloroformate. This method is sometimes called the bischloroformate polymerization method. In one embodiment, the method comprises reacting a 2-hydrocarbyl-3,3-bis(4-hydroxyaryl)phthalimidine with phosgene in an organic solvent, and then reacting the bischloroformate either with a 2-hydrocarbyl-3,3-bis(4-hydroxyaryl)phthalimidine, or an aromatic dihydroxy compound in the presence of an acid acceptor and an aqueous base to form the polycarbonate.

The interfacial polymerization method and the bischloroformate polymerization method can be carried in a batch or a continuous mode using one or more reactor systems. To carry out the process in a continuous mode, one or more continuous reactors, such as for example, a tubular reactor can be used. In one embodiment, the continuous method comprises introducing into a tubular reactor system phosgene, at least one solvent (example, methylene chloride), at least one bisphenol, aqueous base, and optionally one or more catalysts (example, a trialkylamine) to form a flowing reaction mixture. The flowing mixture is then passed through the tubular reactor system until substantially all of the phosgene has been consumed. The resulting mixture is next treated with a mixture comprising an aqueous base, at least one end-capping agent, optionally one or more solvents, and at least one catalyst. The end-capped polycarbonate thus formed is continuously removed from the tubular reactor system. The process can be used for preparing end-capped polycarbonate oligomers (generally polycarbonates having a weight average molecular weight of less than or equal to 10,000 daltons) or polymers having a weight average molecular weight of greater than 10,000 daltons. The processes outlined hereinabove can also be suitably adapted, for example, to produce end-capped polycarbonates via the intermediate formation of a mixture comprising a bisphenol monochloroformate or a bisphenol bischloroformate.

Additives can be employed to modify the performance, properties, or processing of the polymeric material. Exemplary additives comprise antioxidants, such as, organophosphites, for example, tris(nonyl-phenyl)phosphite, tris(2,4-dit-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents. UV absorbers, stabilizers such as light stabilizers and others, lubricants, plasticizers, pigments, dyes, colorants, anti-static agents, flame retardants, impact modifiers, among others.

Once the desired polymer having the 2-hydrocarbyl-3,3-bis(hydroxyphenyl)phthalimidine structural units is formed, various techniques can be employed to form the foamed polymer articles, including a continuous process or a batch process. The batch process is primarily used for making foams with very specific properties or in smaller volumes per batch. The continuous process, however, allows high-output conducive to production scale operations. In one embodiment, the continuous process uses an extruder, e.g., a single screw-extruder or a tandem set-up. Either approach can use co-rotating twin-screws. The process generally comprises introduction of polymeric material and any additive(s) to the throat of the extruder, melting of the polymeric material, dissolution of carbon dioxide in the melted polymeric material, optional plasticization of the polymeric material if needed to depress the glass transition temperature; nucleation of bubbles (e.g., due to pressure drop or temperature increase at die), bubble growth after die; and cell structure stabilization by cooling such as by immersion in a cold medium e.g., water). Desirably, cells nucleate at a rate of from $10^9$ to $10^{18}$ cells per cubic centimeter and grow simultaneously at about the same speed in all directions to produce a foamed article. In one embodiment, the average cell size is about 1 nanometers to 1000 nanometers; in other embodiments, the cell size is 10 nanometers to 500 nanometers; and in still other embodiments, the average cell size is about 10 nanometers to 300 nanometers; and in still other embodiments, the average cell size is about 1 nanometers to 100 nanometers.

Foaming of the polymer is believed to occur as a result of the phase separation kinetics during the foaming process. The mechanism of phase separation may occur by nucleation and growth, by spinodal decomposition, or combinations thereof. The extent of these mechanisms may depend upon the phase diagram of the system. In solid-state foaming, the foaming agent gas molecules diffuse into the polymer at very high saturation pressures to form a single phase (also sometimes referred to as the "homogeneous phase") of "gas-polymer". Pressure and/or temperature quench in the "gas-polymer" then leads to an instability in the system and gas molecules separate themselves from the polymer, which results in nucleation and growth of gas bubbles. The extent of nucleation generally depends upon the number of gas molecules inside the polymer, the magnitude of the pressure drop, and the foaming temperature, i.e., the temperature at which foaming is carried out. The nuclei grow because of the concentration gradient of gas molecules present in the polymer matrix and at the surface of the bubble. Further, the pressure inside the nucleated bubble pushes the polymer matrix against viscoelastic forces and the surface energy of the polymer, which assists in the growth of the bubbles. After some time, the concentration gradient of gas and pressure inside the bubble fall down to a value such that is not sufficient to drive the growth. Continuous melt extrusion foaming also follows nucleation and growth type foaming process as described above.

In one embodiment, a batch process is utilized in which a solid polymer is saturated with a blowing agent (e.g. carbon dioxide gas), which leads to the formation of homogeneous mix. Nucleation of cells is induced by pressure quench or by a change in temperature. The polymer is then subjected to a temperature range close to the glass transition temperature of the polymer and blowing agent mix. The foamed polymer can then be subjected to a temperature quench by contacting with a cold medium for controlling the growth or the cell size.

In another embodiment, the homogeneous mix is continuously fed into an extruder comprising a die to produce the nano-cellular polymer foam article in a continuous process. In this process, the saturation pressure can vary from atmospheric to 100 newtons per millimeter square ($N/mm^2$). The foaming temperature is in the range of glass transition temperature of gas polymer mix. Operating pressure maintained during the foaming step is a parameter. In one embodiment, the contacting step is implemented at a pressure from ambient pressure to about 150 $N/mm^2$. The pressure quench or pressure drop for nucleation range is from 10 $N/mm^2$ per second to 1000 $N/mm^2$ per second.

As noted above, additives for controlling pore size distribution can also be used for different applications. Additives or cell control agents influence the nucleation of foam cells by altering surface tension of the polymer composition or by serving as nucleation sites from which cells can grow. Nucleation agent(s) can be added to the polymer composition to promoting bubble formation during processing. Nucleation agents can be selected to develop cells of a particular pore size. Some possible nucleating agents include talc (magnesium silicate), clay, zeolite, glass-fibers, fumed silica, titanium dioxide, a mixture of citric acid and sodium bicarbonate, zinc oxide, and so forth, as well as combinations comprising at least one of the foregoing. The amount of the nucleation agent(s) employed is dependent upon the process, processing conditions, the specific polymeric material(s), the blowing agent(s), and the desired cell size. In some embodiments, the amount of nucleating agent(s) can be less than or equal to about 10 wt %, or, specifically, about 1 wt % to about 2 wt %, or, more specifically, about 1 wt % to about 2 wt %, wherein the weight percent is based upon a total weight of the polymer composition.

Other additives include those that increase carbon dioxide solubility. These additives include various surfactants such as, without limitation, polypropylene glycol/polyethylene glycols (PPG/PEG) surfactants such as those commercially available under the trade name Pluronics.

The foamed articles can be in the form of a sheet or a three dimensional object. The foamed articles can be used in a wide variety of automotive and industrial applications. Exemplary applications include display and optical sheets, biomedical applications, transparent glazing applications, sandwich panels, energy absorbing parts, and the like. In one embodiment, the nano-cellular foam can be used for producing foam sheets or foam panels, some examples of which include an integrated sandwich panel, a co-laminated panel, a co-extruded panel comprising an inner foam sheet, graded foam sheets, co-extruded foam sheets, corrugated foam sheets, multi-wall foam sheets, an integral sheet structure comprising a foam sheet and a reinforced skin as a top layer, and a multi-wall sheet structure comprising at least one foam sheet disposed between two or more plastic sheets. The foamed product may also comprise an energy absorbing material, a packaging material, a thermal insulation material, an acoustic insulation material, a building construction material, or a building glazing material. Foam products comprising the energy absorbing material may be fabricated into various articles, such as automobile bumpers, which are sometimes required to be softer for pedestrian safety while also be able to meet barrier regulations. Transparent sheets comprising the nano-cellular foams may also be used as light diffusers, such as for example, display device diffusers. Some specific application areas for insulating foam include for example, buildings, refrigerators and refrigeration systems, heaters and heating systems, ventilation systems, air conditioners, ducting systems for transporting hot or cold materials, such as for example liquids, air, and other gases; and cold rooms. Insulating foamed structures may also be used for making high temperature turbine parts, such as for example, turbine blades. Structural and insulation foamed structures are used in building and construction panels, including opaque insulating sandwich panels. Some examples of applications of the nano-cellular polymer foams as a material having both structural properties and transparency include roof glazings, building glazings, construction glazings, automotive glazing. In some instances, a combination of the structural, thermal, and transparency properties of the foamed structures can also be used for many construction applications. Insulating foams comprising a flame retardant may also be useful for producing sandwich cores, which can be used for producing panels for use in air and surface transportation means, such as aircrafts, helicopters, trains, buses, ships, recreational vehicles, and the like. Ultra-low density nano-cellular polymer foams, that is foams having a density that is about 1 to about 20%, specifically 1-10 percent of the bulk density of the polymer of which the foam is made of, can be used as sandwich panels having superior structural and thermal properties. In another embodiment, panels or sheets comprising the nano-cellular polymer foams can comprise an airplane or an automobile outer structural component, a roof, a greenhouse roof, a stadium roof, a building roof, a window, a skylight, or a vehicular roof. Other applications of the nano-cellular polymer foam include those where they may comprise coating applications, for example, a conductive packaging material, an aircraft fuselage insulating material for noise and thermal insulation, a fuel tank coating, an aircraft fuel tank coating, an automotive fuel tank coating, and fuel storage tank coating. Further, the foams may comprise gas mixers, gas diffusers, liquid-gas separators, compact heat exchangers, and orthopedic devices. Furthermore, the foam may comprise a membrane, a sensing device, a floating structure or a weatherable exterior panel. Some examples of specific floating structures include floating docks, marinas, fishing boats, life rafts, ship hulls, life belts, life jackets, and navigation buoys.

The disclosure is explained in more detail with reference to the following non-limiting Examples, which are intended to be illustrative, not limitative.

EXAMPLES

Example 1

Figure 2:
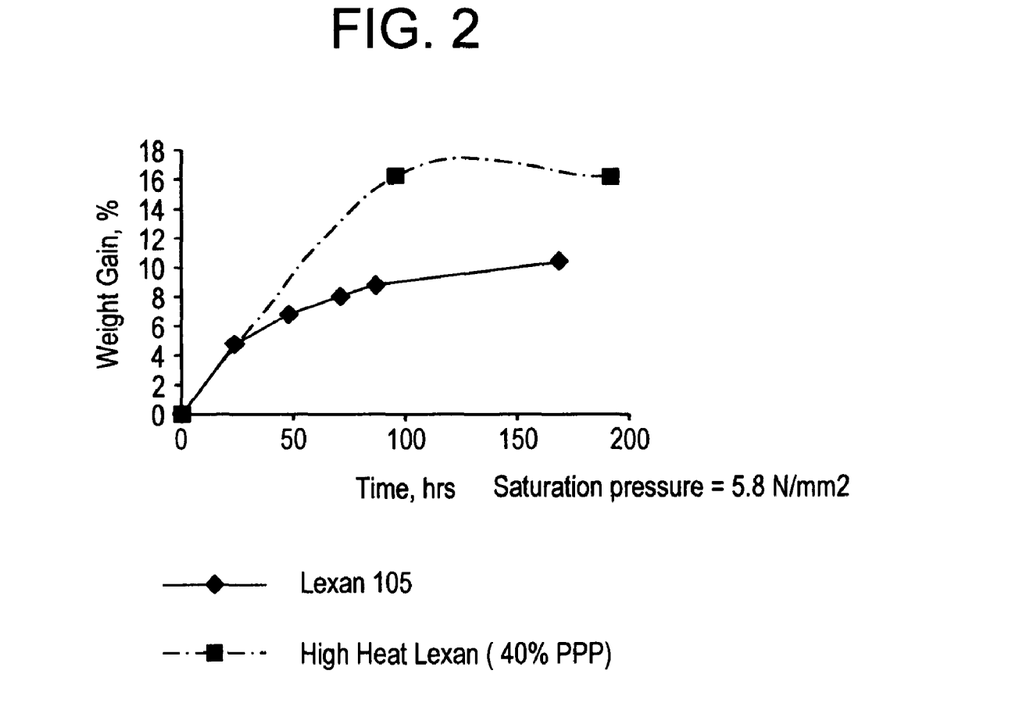
FIG. 2 graphically illustrates carbon dioxide gas weight gain as a function of time for a polycarbonate copolymer that included 40% by weight 2-phenyl-3,3-bis(hydroxyphenyl)phthalimidine structural units and a polycarbonate copolymer that did not include the structural units.
Figure 3:
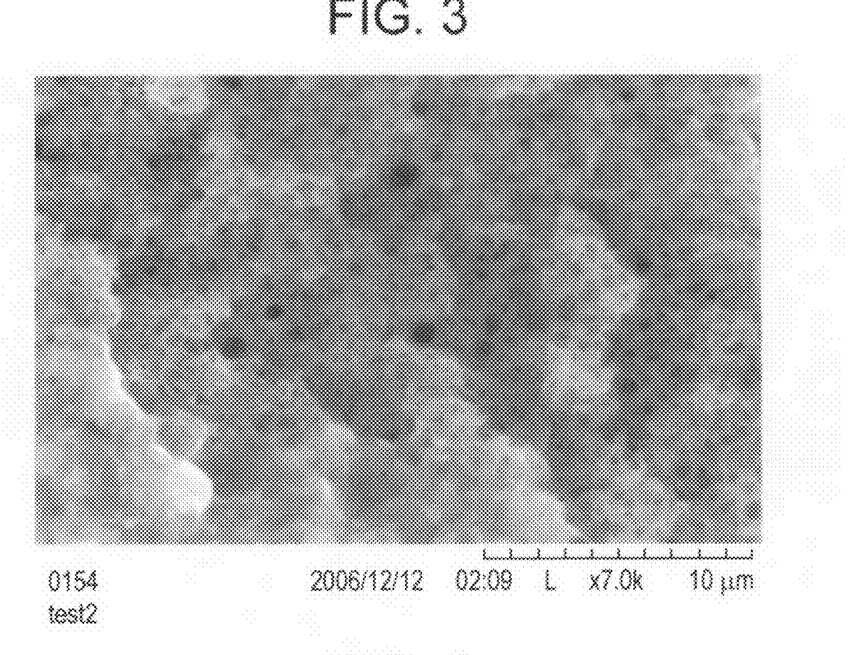
FIG. 3 pictorially illustrates a sectional view of the polycarbonate foam of FIG. 1 that included 40% by weight 2-phenyl-3,3-bis(hydroxyphenyl)phthalimidine structural units.

In this example, a high heat polycarbonate polymer having 40% PPPBP structural units and commercially available from General Electric Company under the trade name LEXAN 8141 was compared to a LEXAN polycarbonate material without the structural units (commercially available under trade name LEXAN 105). The polymers were pre-dried for 3 hours at 150° C. The polymers were saturated with carbon dioxide to a pressure 5.8 N/mm$^2$ for 168 hrs. The polymer having the PPPBP structural units had a weight gain of about 18%, which represented an increase in concentration of carbon dioxide of around 18% by polymer weight, in contrast, the polycarbonate polymer that did not have the structural units had a weight gain of about 10%. The saturated samples were pressure quenched and then foamed at foam temperature of 160° C. for periods of 30 seconds to 10 minutes. The foamed polymers were quenched in water at room temperature so as to stabilize foam growth. As shown in FIG. 2, carbon dioxide solubility was at least 2 to 5 times faster than the polycarbonate without the PPPBP structural units. The higher solubility and higher carbon dioxide content increased foam cell density by three to four orders of magnitude, (e.g., $1 \times 10^{14}$ v. $3.2 \times 10^{10}$ cells/cm$^3$) as well as provided a decrease in foam cell size (e.g., 259 nanometers v. 3.67 microns). FIG. 3 pictorially shows a micrograph of the foamed polycarbonate produced from above process conditions. The mean cell size was 259 nm with a standard deviation of 110 nm and cell density of $1 \times 10^{14}$ cells/cm$^3$. It was also observed that the combination of higher nucleation density and nonporous morphology reduced the bulk density. It was also noted that the glass transition temperature did not change as a result of foaming the polymer. It is also observed that the glass transition temperature of the PPPBP based LEXAN 8141 is higher than the standard LEXAN (LEXAN 105 without PPPBP structural units).

Example 2

Figure 4:
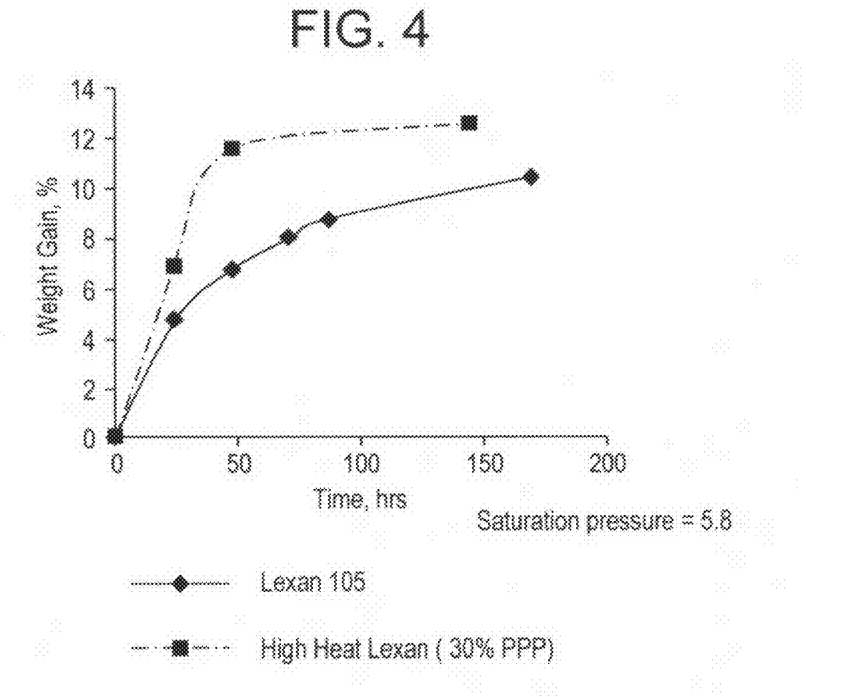
FIG. 4 graphically illustrates carbon dioxide gas weight gain as a function of time for a polycarbonate copolymer that included 30% by weight 2-phenyl-3,3-bis(hydroxyphenyl)phthalimidine structural units and a polycarbonate copolymer that did not include the structural units.
Figure 5:
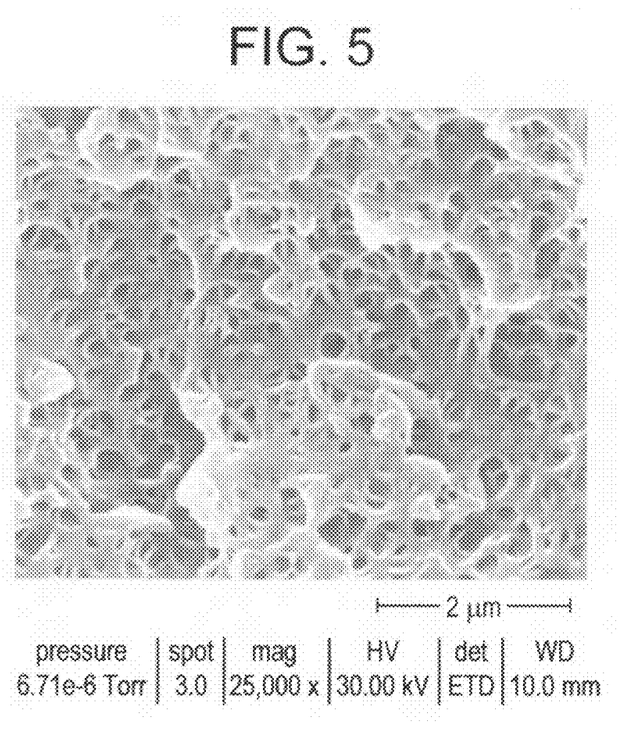
FIG. 5 pictorially illustrates a sectional view of the polycarbonate foam of FIG. 1 that included 40% by weight 2-phenyl-3,3-bis(hydroxyphenyl)phthalimidine structural units.

In this example, a polycarbonate copolymer was used having 30% by weight of the PPPBP structural units and compared to a similar polycarbonate polymer that did not include the structural units. The samples were foamed as in Example 1. Each polymer was saturated with carbon dioxide for 72 hrs at room temperature and then foamed at 160° C. for 30 sec. FIG. 4 graphically illustrates the results and showed an increase in gas concentration for a given time as compared to the polycarbonate without the structural units. FIG. 5 shows a micrograph of the foamed sample having a mean pore size is about 169 nm with standard deviation of 42 nm is produced and cell density of $2.1 \times 10^{10}$ cell/cm$^3$.

Example 3

Figure 6:
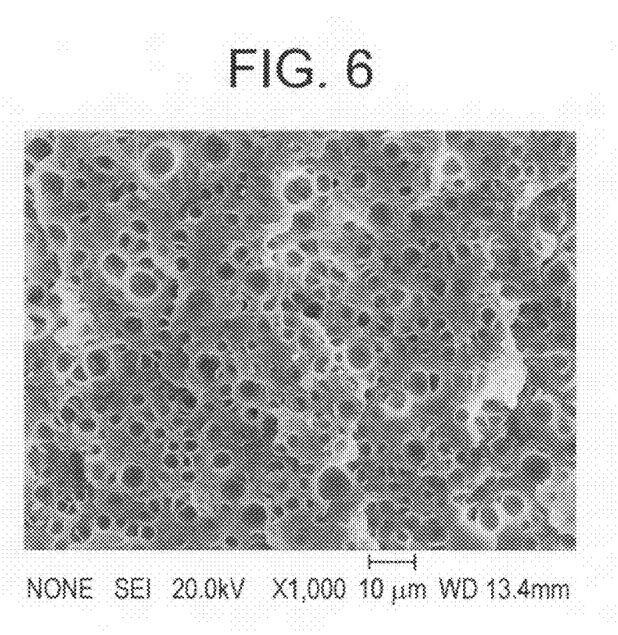
FIG. 6 pictorially illustrates a sectional view of the polycarbonate foam of FIG. 1 that did not include any 2-phenyl-3,3-bis(hydroxyphenyl)phthalimidine structural units.

In this example, the experimental results from processing the standard LEXAN 105 is provided. The LEXAN 105 was saturated at 5.8 N/mm$^2$ for 169 hrs, pressure quenched and then foamed at foam temperature of around of 137° C. for 30 sec. After that, it was quenched in water at room temperature. The baseline in FIGS. 2 and 4 illustrated the solubility of Lexan 105. FIG. 6 pictorially shows a micrograph of LEXAN 105 with mean pore size of about 3.67 microns and with standard deviation of 1.2 micron and cell density of $3.2 \times 10^{10}$ cell/cm$^3$.

In summary, the polycarbonate copolymer with the PPPBP structural units had a lower density than the resin (density prior to forming the nanocellular morphology), uniform cells, nanoporous pore morphology and increased carbon dioxide solubility.

Ranges disclosed herein are inclusive and combinable (e.g., ranges of "up to about 25 wt %, or, more specifically, about 5 wt % to about 20 wt %", is inclusive of the endpoints and all inner values of the ranges of "about 5 wt % to about wt %," etc.). "Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polymeric foamed article, comprising:
    a polymeric material having structural units derived from 2-hydrocarbyl-3,3-bis(hydroxyphenyl)phthalimidine compound; and
    a plurality of foam cells having an average diameter of about 1 nanometer to about 1000 nanometers.

2. The polymeric foamed articles of claim 1, wherein the article is a sheet.

3. The polymeric foamed articles of claim 1, wherein the polymeric material is a homopolymer or a copolymer comprising polycarbonate.

4. The polymeric foamed articles of claim 1, wherein the polymeric material is a homopolymer or a copolymer comprising polyether.

5. The polymeric foamed articles of claim 1, wherein the polymeric material is a homopolymer or a copolymer comprising polyarylate.

6. The polymeric foamed articles of claim 1, wherein the 2-hydrocarbyl-3,3-bis(hydroxyphenyl)phthalimidine compound is 2-phenyl-3,3-bis(hydroxyphenyl)phthalimidine compound.

7. The polymeric foamed articles of claim 1, wherein the plurality of foam cells have a nucleation density of $10^{14}$ to $10^{18}$ cells/cm$^3$.

8. The polymeric foamed articles of claim 1, wherein the relative density of the foam is about 1 to about 20% of bulk density of the polymer of which the foam is made.

9. A method of making a foamed polymeric article, comprising:
    melting a polymeric material having structural units derived from 2-hydrocarbyl-3,3-bis(hydroxyphenyl)phthalimidine compounds;
    diffusing a blowing agent into the polymeric material to form a mixture;
    nucleating bubbles in the mixture at a sufficient temperature and pressure to enable the production of foam cells having an average diameter of about 1 nanometer to about 1000 nanometers;
    stabilizing the foam cells; and forming the mixture into a desired shape.

10. The method of claim 9, wherein the blowing agent is in an amount of about 10 to about 30 wt %, based upon a total weight of the mixture.

11. The method of claim 9, further comprising mixing an additive with the polymeric material, wherein the additive comprises at least one material selected from a group consisting of talc, clay, zeolite, glass-fibers, fumed silica, titanium dioxide, a mixture of citric acid and sodium bicarbonate, and zinc oxide.

12. The method of claim 9, further comprising mixing a surfactant with the polymeric material in an amount effective to increase solubility of the blowing agent relative to the polymeric material without the surfactant.

13. The method of claim 9, wherein the polymeric material is a homopolymer or a copolymer comprising polycarbonate.

14. The method of claim 9, wherein the 2-hydrocarbyl-3,3-bis(hydroxyphenyl)phthalimidine compound is 2-phenyl-3,3-bis(hydroxyphenyl)phthalimidine compound.

15. The method of claim 9, wherein stabilizing the foam cells comprises immersing the mixture in water.

16. The method of claim 9, wherein the polymeric material has a glass transition temperature that does not change upon forming the mixture into a foamed polymeric sheet.

17. The method of claim 16, wherein nucleating bubbles in the mixture at the sufficient temperature and pressure enables the production of foam cells having an average diameter of about 10 nanometers to about 500 nanometers.

18. A method for forming a foamed article, comprising:
    melt extruding a polycarbonate polymer comprising structural units derived from 2-phenyl-3,3-bis(hydroxyphenyl)phthalimidine compounds;
    saturating the polycarbonate polymer with blowing agent at a pressure and at a temperature effective to saturate the polycarbonate polymer with greater than 10 percent by weight of the polymer;
    nucleating bubbles in the mixture at a sufficient temperature and pressure to enable the production of foam cells having an average diameter of about 1 nanometer to about 1000 nanometers; and
    stabilizing the foam cells to form the foamed article.

19. The method of claim 18, further comprising mixing a surfactant with the polycarbonate polymer in an amount effective to increase solubility of the carbon dioxide relative to the polycarbonate polymer without the surfactant.

20. The method of claim 18, wherein the foamed articles is a sheet.

21. The method of claim 18, wherein saturating the polycarbonate polymer with the carbon dioxide gas at the pressure and at the temperature is effective to saturate the polymer with 10 to 30 percent by weight of the carbon dioxide.

* * * * *